United States Patent
Varanasi et al.

(10) Patent No.: US 10,268,368 B2
(45) Date of Patent: Apr. 23, 2019

(54) METHOD AND SYSTEMS FOR TOUCH INPUT

(71) Applicant: INTERDIGITAL CE PATENT HOLDINGS, Paris (FR)

(72) Inventors: Kiran Varanasi, Saarbruecken (DE); Patrick Perez, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 103 days.

(21) Appl. No.: 15/314,495

(22) PCT Filed: May 26, 2015

(86) PCT No.: PCT/EP2015/061577
§ 371 (c)(1),
(2) Date: Nov. 28, 2016

(87) PCT Pub. No.: WO2015/181159
PCT Pub. Date: Dec. 3, 2015

(65) Prior Publication Data
US 2018/0239526 A1 Aug. 23, 2018

(30) Foreign Application Priority Data
May 28, 2014 (EP) .................................. 14305801

(51) Int. Cl.
*G06F 3/0488* (2013.01)
*G06F 3/041* (2006.01)

(52) U.S. Cl.
CPC .......... *G06F 3/04883* (2013.01); *G06F 3/041* (2013.01); *G06F 2203/04104* (2013.01); *G06F 2203/04808* (2013.01)

(58) Field of Classification Search
CPC ... G06F 3/041–3/047; G06F 3/0488–3/04897; G06F 2203/04104; G06F 2203/04808
See application file for complete search history.

(56) References Cited

U.S. PATENT DOCUMENTS

| | | | |
|---|---|---|---|
| 7,030,861 B1* | 4/2006 | Westerman | G06F 3/04883 345/173 |
| 7,170,496 B2* | 1/2007 | Middleton | G04G 21/08 345/168 |

(Continued)

FOREIGN PATENT DOCUMENTS

WO WO9942920 8/1999

OTHER PUBLICATIONS

Anonymous, "Event Handling Guide for iOS", Apple Inc., Cupertino, California, USA, Jan. 28, 2013, pp. 1-74.

(Continued)

*Primary Examiner* — Gene W Lee
(74) *Attorney, Agent, or Firm* — Jeffrey M. Navon

(57) ABSTRACT

Various systems and methods for determining a set of gesture components of touch input are provided. Touch data can be obtained (301), and a number of gesture components to be generated can be selected (302). A set of gesture components can be generated (303) based on the touch data and the number. For example, a sparse matrix decomposition can be used to generate the set of gesture components. The set of gesture components can be stored (304) in a non-transitory computer-readable medium.

14 Claims, 16 Drawing Sheets

(56) References Cited

U.S. PATENT DOCUMENTS

| | | | | |
|---|---|---|---|---|
| 7,519,223 | B2* | 4/2009 | Dehlin | G06F 3/0354 345/173 |
| 8,169,414 | B2* | 5/2012 | Lim | G06F 3/03547 178/18.01 |
| 8,175,728 | B2* | 5/2012 | Weinberg | G06F 3/043 345/177 |
| 8,196,066 | B1* | 6/2012 | Ouyang | G06F 3/04883 715/708 |
| 8,345,014 | B2* | 1/2013 | Lim | G06F 3/03547 178/18.01 |
| 8,436,821 | B1 | 5/2013 | Plichta et al. | |
| 8,479,122 | B2* | 7/2013 | Hotelling | G06F 3/0418 715/863 |
| 8,702,513 | B2* | 4/2014 | Lim | G06F 3/03547 463/31 |
| 8,751,972 | B2* | 6/2014 | Ouyang | G06F 3/04883 715/863 |
| 8,754,862 | B2* | 6/2014 | Zaliva | G06F 3/03547 345/173 |
| 9,323,985 | B2* | 4/2016 | Heim | G06K 9/00335 |
| 9,594,893 | B2* | 3/2017 | Feng | G06F 21/36 |
| 9,678,664 | B2* | 6/2017 | Zhai | G06F 3/0219 |
| 9,874,977 | B1* | 1/2018 | Soyannwo | G06F 3/042 |
| 10,152,148 | B2* | 12/2018 | Kuo | G06F 3/0416 |
| 2007/0262964 | A1* | 11/2007 | Zotov | G06F 3/0416 345/173 |
| 2010/0095234 | A1 | 4/2010 | Lane | |
| 2011/0314427 | A1 | 12/2011 | Sundararajan | |
| 2012/0007821 | A1 | 1/2012 | Zaliva | |
| 2012/0092286 | A1* | 4/2012 | O'Prey | G06F 3/0416 345/174 |
| 2012/0274583 | A1* | 11/2012 | Haggerty | G06F 3/0488 345/173 |
| 2012/0280927 | A1* | 11/2012 | Ludwig | G06F 3/041 345/173 |
| 2013/0009869 | A1 | 1/2013 | Wilensky | |
| 2013/0141375 | A1* | 6/2013 | Ludwig | G06F 3/0488 345/173 |
| 2014/0050354 | A1* | 2/2014 | Heim | G06K 9/00335 382/103 |
| 2014/0375572 | A1* | 12/2014 | Shanmugam | G06F 3/0484 345/173 |

OTHER PUBLICATIONS

Morris et al., "Cooperative Gestures: Multi-User Gestural Interactions for Co-located Groupware", ACM Conference on Human Factors in Computing Systems (CHI 2006), Montreal, Quebec, Canada, Apr. 22, 2006, pp. 1-10.
Kato, J., "Multi-touch Vector Field Operation for Navigating Multiple Mobile Robots", Association for Computing Machinery Student Research Competition, 2010, pp. 1-12.
Bailly et al., "Finger-Count & Radial-Stroke Shortcuts: Two Techniques for Augmenting Linear Menus on Multi-Touch Surfaces", ACM Conference on Human Factors in Computing Systems (CHI 2010), Atlanta, Georgia, USA, Apr. 10, 2010, pp. 1-4.
Buxton, "Multi-Touch Systems that I Have Known and Loved", www.billbuxton.com/multitouchOverview.html, Jan. 12, 2007, pp. 1-22.
Igarashi et al., "As-Rigid-As-Possible Shape Manipulation", ACM Transactions on Graphics, Proceedings of ACM SIGGRAPH, vol. 24, No. 3, Jul. 2005, pp. 1134-1141.
Kruger et al., "Fluid Integration of Rotation and Translation", ACM Conference on Human Factors in Computing Systems (CHI 2005), Portland, Oregon, USA, Apr. 2, 2005, pp. 1-10.
Lepinski et al., "The Design and Evaluation of Multitouch Marking Menus", ACM Conference on Human Factors in Computing Systems (CHI 2010), Atlanta, Georgia, USA, Apr. 10, 2010, pp. 2233-2242.
Liu et al., "TNT: Improved Rotation and Translation on Digital Tables", Conference on Graphics Interface 2006, Quebec, Quebec, Canada, Jun. 7, 2006, pp. 1-8.
Malik, S., "An Exploration of Multi-Finger Interaction on Multi-Touch Surfaces", Doctor of Philosophy Thesis, University of Toronto, Department of Computer Science, Sep. 2007, pp. 1-184.
Nacenta et al., "Separability of Spatial Manipulations in Multi-touch Interfaces", Conference on Graphics Interface 2009, Kelowna, British Columbia, Canada, May 25, 2009, pp. 175-182.
Reisman et al., "A Screen-Space Formulation for 2D and 3D Direct Manipulation", ACM Symposium on User Interface Software and Technology, Victoria, British Columbia, Canada, Oct. 4, 2009, pp. 69-78.
Damaraju et al., "Comparing Multi-Touch Interaction Techniques for Manipulation of an Abstract Parameter Space", ACM Symposium on User Interface Software and Technology, Victoria, British Columbia, Canada, Oct. 4, 2009, pp. 1-5.
Damaraju et al., "Multi-Tap Sliders: Advancing Touch Interaction for Parameter Adjustment", ACM International Conference on Intelligent User Interfaces, Santa Monica, California, USA, Mar. 19, 2013, pp. 445-452.
Harrison et al., "TouchTools: Leveraging Familiarity and Skill with Physical Tools to Augment Touch Interaction", SIGCHI Conference on Human Factors in Computing Systems, Toronto, Ontario, Canada, Apr. 26, 2014, pp. 2913-2916.
Hoggan et al., "Multi-Touch Rotation Gestures: Performance and Ergonomics", ACM Conference on Human Factors in Computing Systems (CHI 2013), Paris, France, Apr. 27, 2013, pp. 1-4.
Lu et al., "Gesture Studio: Authoring Multi-Touch Interactions through Demonstration and Declaration", ACM Conference on Human Factors in Computing Systems (CHI 2013), Paris, France, Apr. 27, 2013, pp. 1-10.
Lu et al., "Gesture-Coder: A Tool for Programming Multi-Touch Gestures by Demonstration", ACM Conference on Human Factors in Computing Systems (CHI 2012), Austin, Texas, USA, May 5, 2012, pp. 1-10.
Neumann et al., "Sparse Localized Deformation Components", ACM Transactions on Graphics, Proceedings of ACM SIGGRAPH Asia 2013, vol. 32, No. 6, Article No. 179, Nov. 2013, pp. 1-10.
Rhodin et al., "Interactive Motion Mapping for Real-time Character Control", Proceedings of EUROGRAPHICS, vol. 33, No. 2, 2014, pp. 1-10.
Wobbrock et al., "User-Defined Gestures for Surface Computing", ACM Conference on Human Factors in Computing Systems, CHI 2009, Boston, Massachusetts, USA, Apr. 4, 2009, pp. 1-10.
Zhai et al., "Foundational Issues in Touch-Screen Stroke Gesture Design—An Integrative Review", Foundations and Trends in Human-Computer Interaction, vol. 5, No. 2, 2012, pp. 97-205.
Damaraju et al., "Muititouch Gesture Learning and Recognition System", IEEE Tabletops and Interactive Surfaces 2008, Amsterdam, the Netherlands, Oct. 1, 2008, pp. 1-2.
Hoggan et al., "Multi-Touch Pinch Gestures: Performance and Ergonomics", ACM Interactive Tabletops and Surfaces 2013 Conference, St. Andrews, Scotland, United Kingdom, Oct. 6, 2013, pp. 219-222.
Jacob et al., "Integrality and Separability of Input Devices", ACM Conference on Human Factors in Computing Systems, CHI 1994, Boston, Massachusetts, USA, Apr. 24, 1994, pp. 1-40.
Morris et al., "Understanding Users' Preferences for Surface Gestures", Conference on Graphics Interface 2010, Ottawa, Ontario, Canada, May 31, 2010, pp. 261-268.
Wu et al., "Multi-Finger and Whole Hand Gestural Interaction Techniques for Multi-User Tabletop Displays", ACM Symposium on User Interface Software and Technology, Vancouver, British Columbia, Canada, Nov. 2, 2003, pp. 193-202.
Moscovich et al., "Multi-finger Cursor Techniques", Conference on Graphics Interface 2006, Quebec, Quebec, Canada, Jun. 7, 2006, pp. 1-7.
Wilson et al., "Bringing Physics to the Surface", ACM Symposium on User Interface Software and Technology, Monterey, California, USA, Oct. 19, 2008, pp. 67-76.
Vollmer et al., "Sparse coding of human motion trajectories with non-negative matrix factorization", Neurocomputing, vol. 124, Apr. 4, 2013, pp. 22-32.

(56) References Cited

OTHER PUBLICATIONS

Vollmer et al., "Sparse coding of human motion trajectories with non-negative matrix factorization", Neurocomputing, vol. 124, Jan. 2014, pp. 22-32.

* cited by examiner

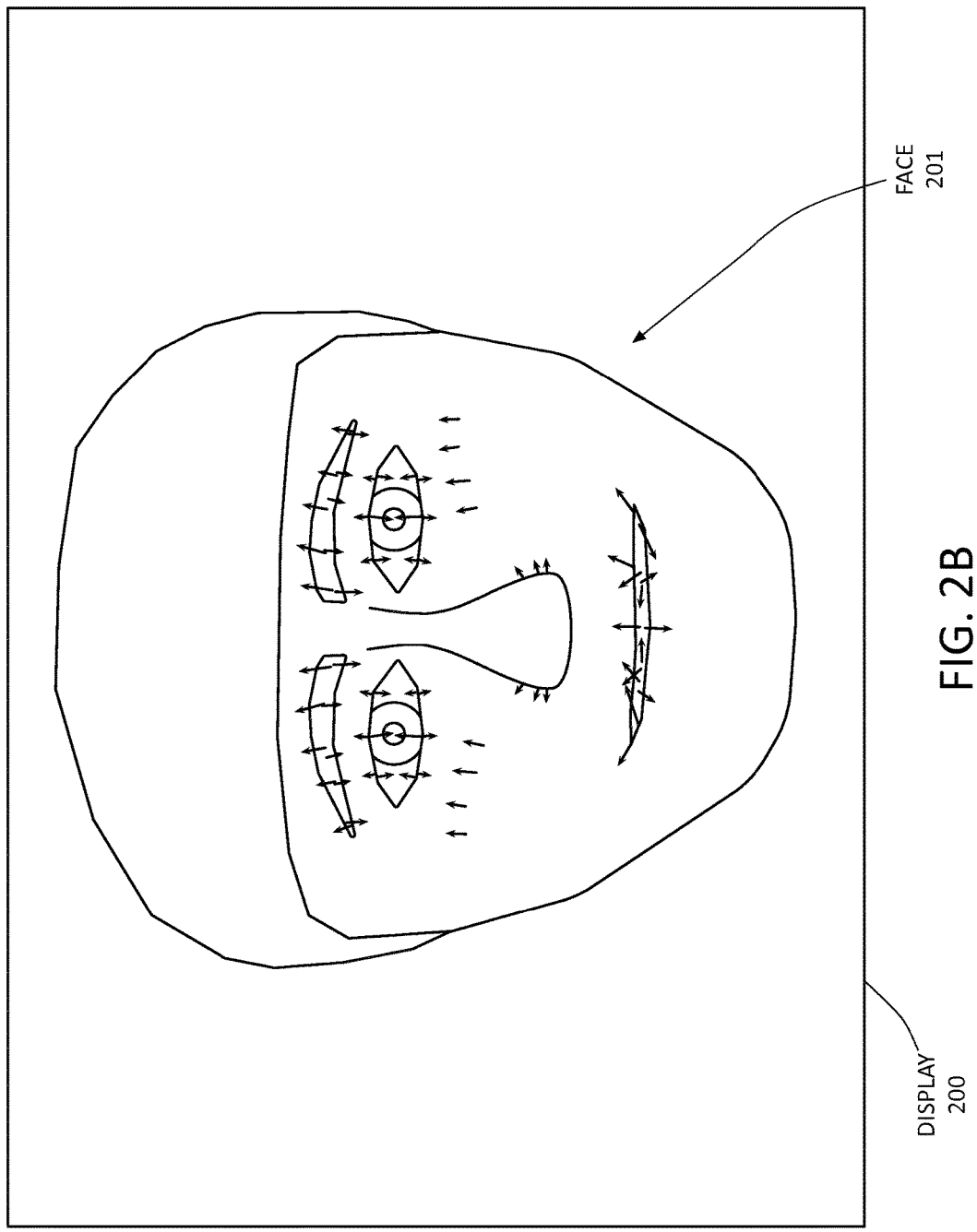

METHOD AND SYSTEMS FOR TOUCH INPUT

This application claims the benefit, under 35 U.S.C. § 365 of International Application PCT/EP 2015/061577 filed May 26, 2015, which was published in accordance with PCT Article 21(2) on Dec. 3, 2015, in English, and which claims the benefit of European Application No. 14305801.4, filed May 28, 2014. The European and PCT applications are expressly incorporated by reference herein in their entirety for all purposes.

TECHNICAL FIELD

The present disclosure generally relates to methods and systems for touch input.

BACKGROUND

Many types of input devices are presently available for performing operations in a computing system, such as buttons or keys, mice, trackballs, joysticks, and the like. Touch-sensing devices, such as trackpads and touchscreens, are becoming increasingly popular because of their ease and versatility of operation as well as their declining price. Touchscreens can allow a user to perform various functions by touching the touchscreen using a finger, stylus or other object at a location that may be dictated by a user interface (UI) being displayed by touchscreen. In general, touch-sensing devices can sense a touch event on or near a touch surface of the device as well as the position of the touch event on the touch surface, and the computing system can then interpret the touch event to perform one or more actions based on the touch event.

SUMMARY

Described herein are various systems and methods for determining a set of gesture components of touch input. In various embodiments touch data can be obtained, and a number of gesture components to be generated can be selected. A set of gesture components can be generated based on the touch data and the number. The set of gesture components can be stored in a non-transitory computer-readable medium. In some embodiments, obtaining the touch data can include sensing touch contacts on a touch-sensing surface, which can include, for example, periodically capturing the touch data at a predetermined time interval, receiving an indication of a user and capturing the touch data based on the indication, etc. In some embodiments, the touch data can include, for example, an absolute motion, a relative motion, an absolute position, a relative position, an absolute proximity, a relative proximity, a change in proximity, an absolute size, a relative size, a change in size, etc. In some embodiments, the number of gesture components to be generated can be based on a number of control inputs of a computing system. In some embodiments, the touch data can be stored in a matrix, and generating the set of gesture components can include performing a sparse matrix decomposition of the matrix. In some embodiments, the gesture components can be nonorthogonal, and in some embodiments, the number of gesture components can be greater than the number of degrees of freedom capable of being detected by a touch-sensing system used to sense the touch data.

BRIEF DESCRIPTION OF THE DRAWINGS

FIGS. 2A and 2B illustrate an example of a computer application that can include more complex functions to be controlled by touch input.

It should be understood that the drawings are for purposes of illustrating the concepts of the disclosure and are not necessarily the only possible configurations for illustrating the disclosure.

DETAILED DESCRIPTION

Figure 1:
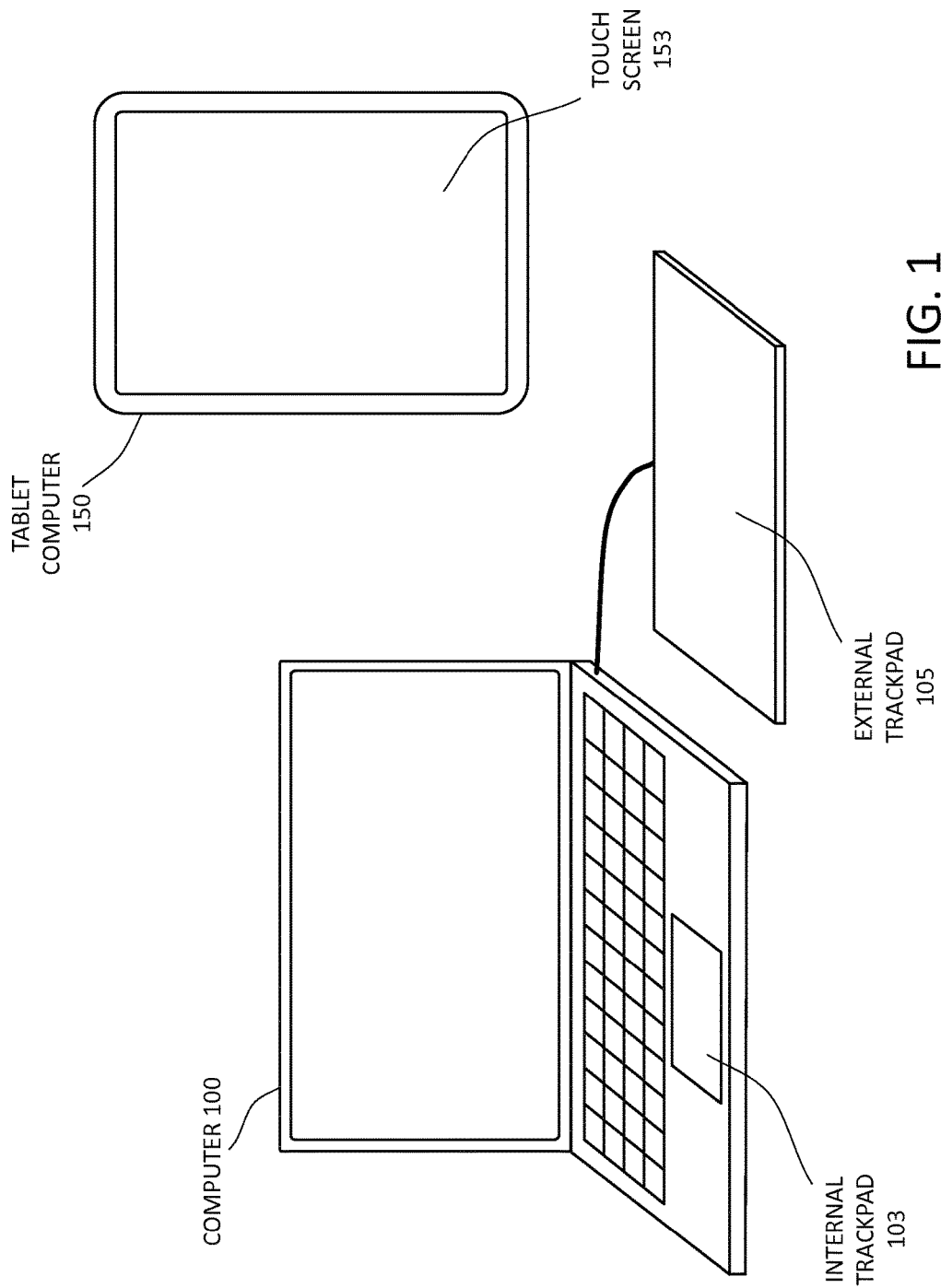
FIG. 1 illustrates some examples of systems in which various embodiments of the disclosure may be implemented.

Touch-sensing can provide an intuitive platform for input. Trackpads and touchscreens can sense multiple contacts, e.g., fingers, styluses, etc., moving on or near a touch-sensing surface. The techniques disclosed herein may be implemented in any kind of device that can process touch input, such as a personal computer with a track pad, a smart phone or tablet computer with a touch screen, etc. For example, FIG. 1 illustrates some examples of systems in which various embodiments of the disclosure may be implemented. FIG. 1 illustrates a computer 100, which can include an internal touch-sensing surface, such as an internal trackpad 103. An external touch-sensing surface, such as an external trackpad 105, can be connected to computer 100 via a wired connection, as shown in FIG. 1, or via a wireless connection. FIG. 1 also illustrates a tablet computer 150, which can include a touch-sensing surface, such as a touchscreen 153.

In conventional gesture processing, a touch-sensing surface senses the motion of contacts, and the touch-sensing system processes the contact motion by decomposing the contact motion into various motion components. In other words, the touch-sensing system extracts the various motion components from the contact motion. These motion components are associated with the degrees of freedom of motion that the touch-sensing system is capable of sensing for multiple contacts on the touch-sensing surface, as one skilled in the art would readily understand. In conventional gesture processing, the number of extracted motion components is typically equal to the number of degrees of freedom of motion that is capable of being detected by the touch-sensing system. The degrees of freedom detectable in typical touch-sensing systems include a horizontal translation component and a vertical translation component (i.e., motion in the x and y directions) for each contact, a rotation component for each pair of contacts, and a scaling component (i.e., "pinching" and "anti-pinching", i.e., expanding) for each pair of contacts. Other degrees of freedom can be detected in more advanced touch-sensing system, as one skilled in the art would understand. For example, some touch-sensing systems can detect the rotational orientation of individual contacts, in addition to detecting a rotational orientation of each pair of contacts. In this case, the extractable motion components would include an additional rotation component for each individual contact. Likewise, some advanced touch-sensing systems can differentiate between a whole-hand rotation (such as when the extension of the fingers remains relatively constant while the wrist rotates, as if unscrewing the cap of a large jar) and a finer, fingertip rotation (such as when the thumb and fingers curl around each other while the wrist stays relatively stationary, as if unscrewing a loose bottle cap or turning a knob). In this case, the extractible motion components would include components based on these two additional degrees of freedom detected by the touch-sensing system. As one skilled in the art would understand, the number of extractible motion components is a known parameter of each particular touch-sensing system.

Once the motion components are extracted, they can then be used to determine gesture input for various functions, controls, etc., of the computing system. For example, a combination of vertical and horizontal translation components could be used to move a mouse cursor. In another example, the vertical translation component can be used to scroll a webpage. Scrolling a webpage, for example, involves the actions of moving the webpage up and down on the display, and matching the vertical control motion of the scrolling action with the vertical translation component can provide intuitive control of scrolling using corresponding up and down directions of the vertical motion component. For example, placing two fingers on a trackpad and sliding the fingers in an upward direction on the trackpad is a typical and intuitive touch input for a scroll up action (or a scroll down action, for so-called "natural scrolling" in which the webpage moves in the same direction as the touch input motion). Some gestures can be defined to be equivalent to a single motion component, such as in the case of vertical translation of two fingers defined as the gesture for scrolling. Other gestures can be defined to be a combination of two or more motion components, such as in the case of a single finger horizontal and vertical translations defined as the gesture for mouse cursor movement.

It should be appreciated that the number of motion components associated with the degrees of freedom of motion is limited by the number of degrees of freedom sensed by the touch-sensing system. A limited number of motion components can in turn limit the number of simultaneous inputs that can reasonably be performed in an intuitive manner through touch input. Some systems attempt to increase the number of gestures by, for example, differentiating gestures based on the number of contacts (such as differentiating single-finger vertical translation, i.e., mouse cursor movement, from two-finger vertical translation, i.e., scrolling). However, using a limited number of motion components as the basis for gestures can still impose limits on the system. For example, using number of fingers to differentiate between gestures based the limited number of motion components can result in the undesirable consequence that some gestures cannot be performed simultaneously in an intuitive manner. For example, single-finger mouse cursor movement cannot be performed at the same time as two-finger scrolling because it would be difficult to divide the motion of the two fingers between mouse movement and scrolling or decide which of the two fingers should be used for mouse movement, in a way that is sensible and intuitive.

One reason the number of motion components extracted in typical touch-sensing systems is limited to the number of degrees of freedom is that typical touch-sensing systems extract orthogonal motion components, e.g., vertical and horizontal translation, rotation, and scaling. As one skilled in the art would appreciate, orthogonal motion components are motion components that are perpendicular to each other. In two-dimensional real space and three-dimensional real space, two vectors v and w are orthogonal if and only if their dot product equals zero, i.e., v·w=0. It should be noted that any two vectors that do not meet this condition are nonorthogonal, i.e., vectors v and w are nonorthogonal if v·w≠0. More generally, two elements v and w of an inner product space E are orthogonal if the inner product of v and w is 0. Likewise, two elements v and w of an inner product space E are nonorthogonal if the inner product of v and w is not 0. Because the motion components are orthogonal, each extracted motion component is linearly independent of the other extracted motion components.

In the conventional wisdom of gesture processing, separating contact motion into orthogonal components is considered desirable and, in fact, effort is made to prevent "bleeding" of one motion component into another. For example, a user might touch down two fingers side-by-side on a trackpad and then slide the left finger up (i.e., towards the top edge of the trackpad). A conventional gesture processing system must quickly decide whether the motion is intended to be a vertical translation of the left finger or is the beginning of a two-finger rotation in the clockwise direction. If the motion is intended to be a vertical translation, the user may desire to move the mouse cursor, for example. On the other hand, if the motion is intended to be a clockwise rotation, the user may desire to rotate a currently viewed page in a document, for example. If the touch system misinterprets the motion of the left finger as a vertical translation when in fact the user intends the motion to be the start of a rotation, then some of the rotation component is said to have "bled" into the vertical translation component. For this reason, gesture processing based on extraction of orthogonal motion components can become quite complicated in systems that allow simultaneous (e.g., overlapping) control of multiple functions using multiple touch inputs. As in the example above, if the system allows touch input to control the motion of the mouse cursor and the rotation of the document page simultaneously, the system may have to determine quickly how much of the motion of the left finger should be allocated to the vertical translation component and how much of the motion should be allocated to the rotation component. In other words, conventional gesture processing systems frequently, if not constantly, need to resolve the question, "How much of the motion of the contacts is meant to be a horizontal translation, how much is meant to be a vertical translation, how much is meant to be a rotation, and how much is meant to be a scaling?" Because the motion of human touch is fluid and often imprecise, ambiguities can frequently arise with regard to what touch input the user intends. In order to maintain responsive and intuitive touch input, conventional systems must resolve these ambiguities quickly and correctly.

The use of orthogonal motion components can have other drawbacks as well. For example, relying on orthogonal motion components can make it more difficult to create intuitive gestures for more complex functions, controls, etc., of a computing system. For example, while it may be intuitive to map the up and down motion of scrolling a webpage to the vertical translation component, other functions might require more complicated motions that do not have such a straightforward correspondence to an orthogonal motion component.

Figure 2A:
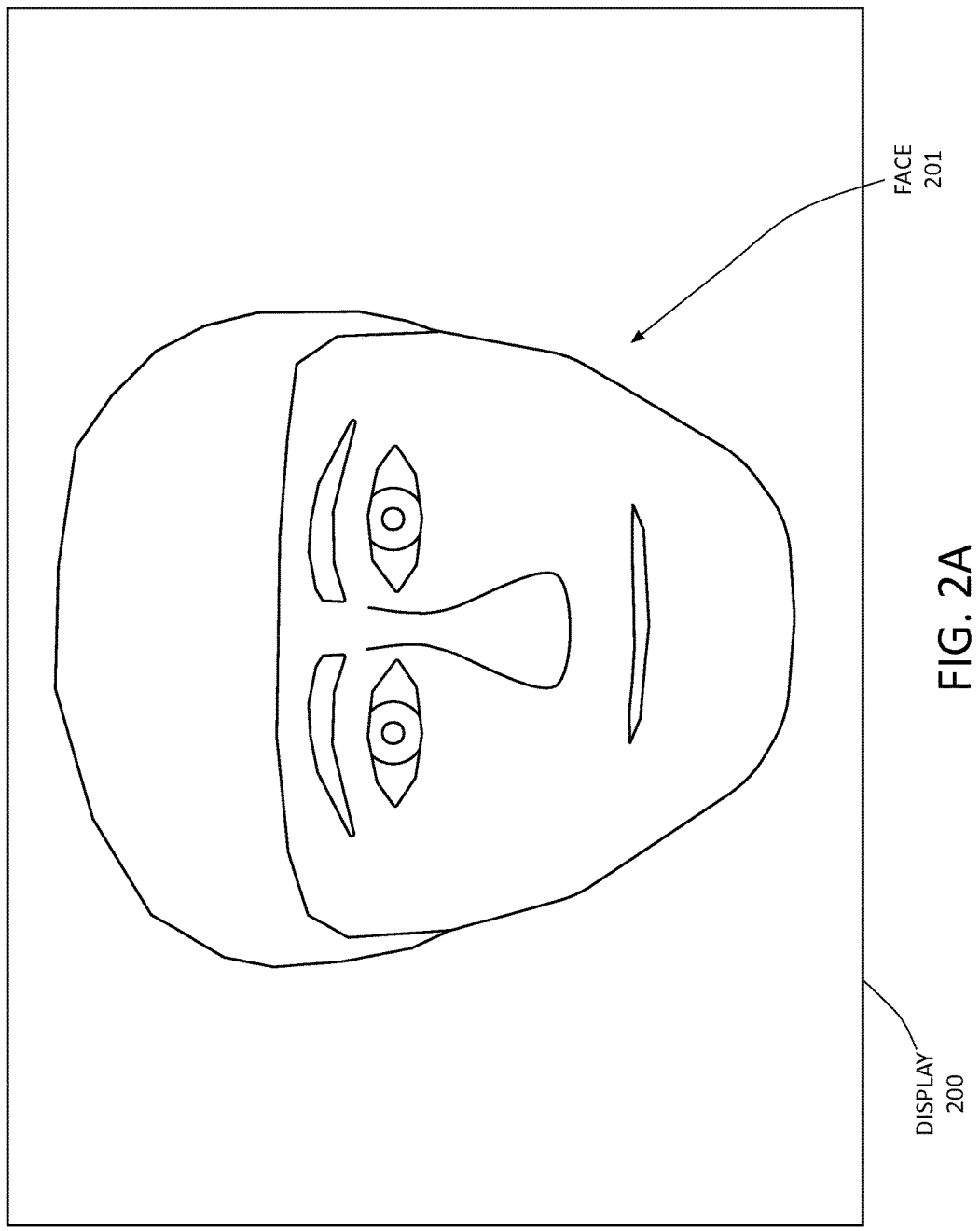

For example, FIGS. 2A and 2B illustrate an example of a computer application that can include more complex functions to be controlled by touch input. FIG. 2A shows a computer display 200 with a computer-generated face 201 displayed by a computer software application for animating facial expressions according to various embodiments. The software application can allow touch input to adjust various features of face 201, such as the eyebrows, the eyes, the mouth, etc., which can create various facial expressions on the face. It should be appreciated that a human face is a complex structure including 42 muscles and connective tissue that collectively operate to make possible the expression of a range of human emotions. FIG. 2B includes arrows that show only a small sample of the possible motions, e.g., deformations, of various points on the surface of face 201. For example, various parts of the eyebrows can move up and down semi-independently, the eyelids can open and close, the nostrils can flare, the cheeks can scrunch upwards, and the lips can perform a vast number of complex deformations, as evidenced by the complexity of human speech.

Determining a set of gestures that would provide intuitive control of the numerous and complex deformations of face 201 based on a limited number of motion components extracted from touch data would be difficult, if not impossible. This task can be even more difficult if the motion components of touch data are constrained to be orthogonal motion components, such as horizontal and vertical translation, rotation, and scaling.

In sum, touch systems based on decomposing contact motion into a limited and fixed number of orthogonal basis motions can be limited to a small set of relatively simple gestures such as tap, swipe, pinch in, pinch out, etc., that can be used as input for a small set of relatively simple functions, controls, etc. While these motion components may be a good match with certain computer functions, controls, actions, etc., more complex computer functions can be difficult to match with the limited number of motion components extracted from touch data in conventional touch systems. In fact, even simple functions can require a great deal of tweaking, filtering, etc., in order to match touch input to the function in a way that maintains an intuitive feel for the user.

Figure 3:
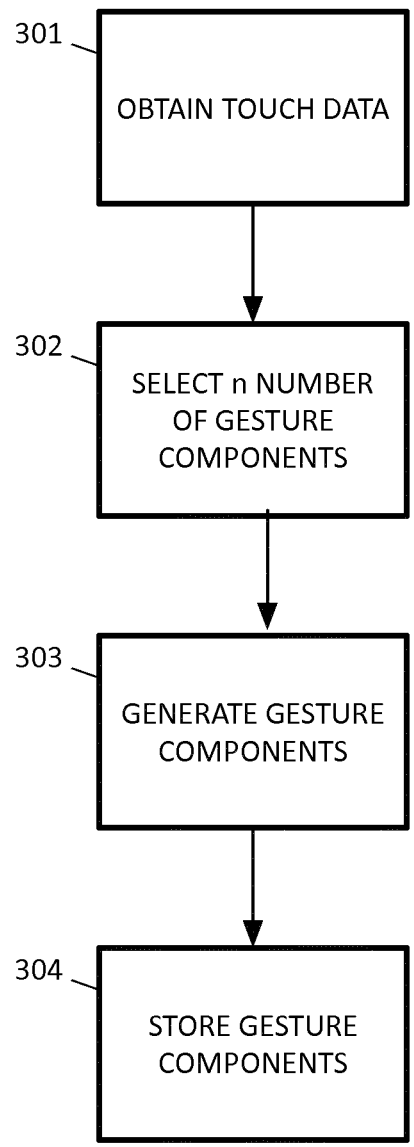
FIG. 3 is a flowchart that illustrates an example of a method of determining gesture components according to various embodiments.
Figure 4:
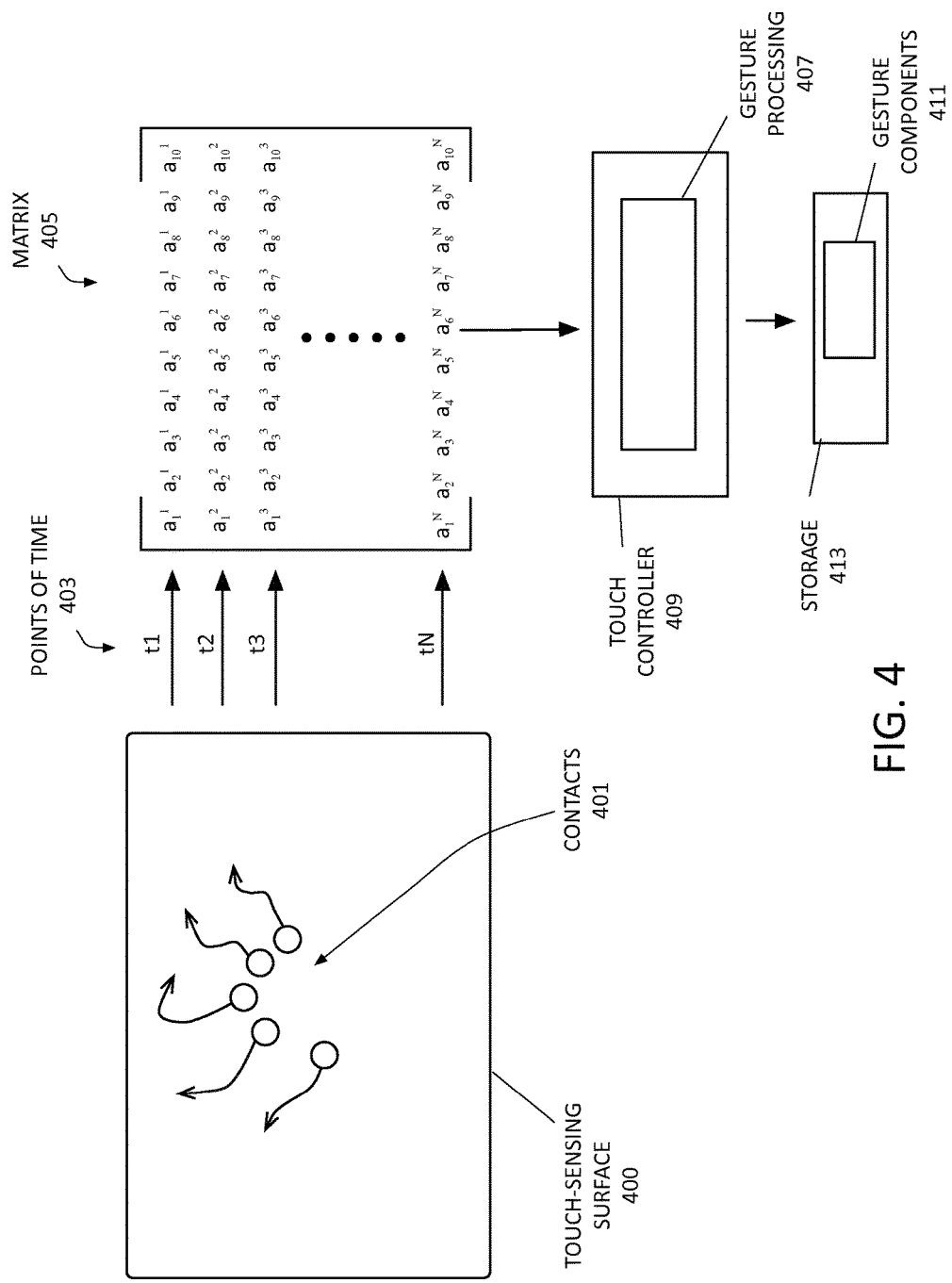
FIG. 4 illustrates an example of a system for determining gesture components according to various embodiments.
Figure 5:
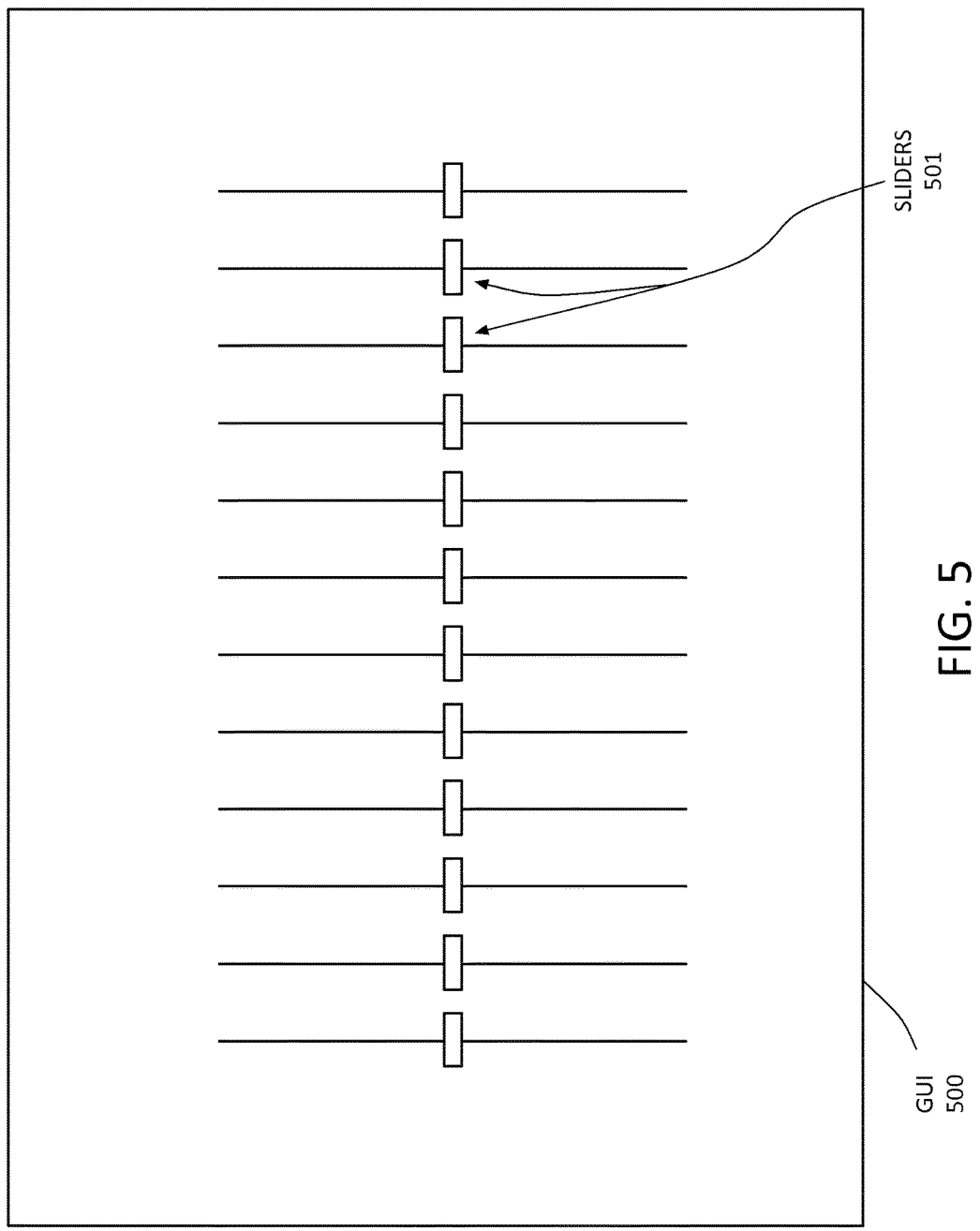
FIG. 5 illustrates an example of a sound-mixing software application that can use gesture components according to various embodiments.

Various embodiments of the disclosure may help reduce or eliminate some of the problems discussed above. FIGS. 3-5 illustrate examples of methods and systems of determining gesture components according to various embodiments. Gesture components can be, for example, particular contact motions, positions, configurations (i.e., relative positions), etc., that can be extracted from touch data and subsequently used to process touch input. In some sense, once a set of gesture components has been determined, the gesture components can serve a similar purpose as the above-described motion components. In various embodiments, for example, touch input can be processed by decomposing contact motion into predetermined gesture components, and the decomposed contact motion can be used to determine control inputs of a computing system. It should be noted that gesture components can be extracted from touch data that can include, but is not limited to, contact motion, contact position, contact proximity (e.g., pressure), contact size, etc. In addition, it should be appreciated that various embodiments can be based on absolute motion, relative motion, absolute position, relative position, absolute proximity, relative proximity, change in proximity, absolute size, relative size, change in size, etc.

In some embodiments, the number of gesture components can be greater than the number of degrees of freedom detectable by the touch-sensing system.

In other embodiments, the number of gesture components can be the same or less than the number of degrees of freedom detectable by the touch-sensing system. For example, contact motions, positions, etc., in the two-dimensional space of a touch-sensing surface can be parameterized and a mapping can be learned from this space to a parameter space for controlling inputs. The dimension of the parameter space (and hence the number of gesture components) can be selected, for example, to correspond to the number of desired control inputs. In this way, for example, the number of gesture components can be selected to be greater than, less than, or equal to the degrees of freedom detectable by the touch-sensing system.

In some embodiments, the gesture components can be nonorthogonal, and in other embodiments, the gesture components can be orthogonal, as will be explained in more detail below.

FIG. 3 is a flowchart that illustrates an example of a method of determining gesture components according to various embodiments, FIG. 4 illustrates an example of a system for determining gesture components according to various embodiments, and FIG. 5 illustrates an example of a sound-mixing software application that can use gesture components according to various embodiments.

Referring first to the method of FIG. 3, touch data can be obtained (301). For example, a user can freely move his or her fingers on a touch-sensing surface, i.e., freeform touch that is independent of any particular function, control, action, etc., and touch data can be captured and stored at different times. In various embodiments, for example, touch data can be periodically captured at a predetermined time interval. In various embodiments, an indication can be received from the user, such as a mouse-click on specified graphical user interface (GUI) button, and touch data can be captured based on the indication. Capturing and storing freeform touch data can, for example, allow gesture components to be determined based on the natural motion of the contacts on a touch-sensing surface.

Referring to FIG. 4, a touch-sensing surface 400 can be used, and a user can move his fingers on the touch-sensing surface. Touch-sensing surface 400 can detect contacts 401 corresponding to the user's fingers. At various points in time 403, contact data can be stored in a data structure, such as a matrix 405.

Referring to FIG. 3, a number 'n' can be selected (302). The number can represent the number of gesture components to be determined from the touch data. In various embodiments, the number of gesture components to be determined can correspond to a number of simultaneous computer functions, controls, actions, etc., that are to be controlled by touch input. For example, FIG. 5 shows a GUI 500 including twelve sliders 501. Sliders 501 can be moved simultaneously and can control, for example, various aspects of sound mixing performed by the software application.

Gesture components for processing touch input in applications with twelve simultaneous controls, such as the sound-mixing software application of FIG. 5, can be determined by selecting the number n=12 in the method of FIG. 3.

Referring to FIG. 3, gesture components can be generated (303) based on the stored touch data and the number of gesture components to be determined. In various embodiments, gesture components can be generated based on a sparse matrix decomposition on a matrix of stored touch data, such as matrix 405. An example of such a sparse matrix decomposition is explained in more detail below. In this way, for example, it can be possible to generate a set of gesture components that are localized and distinctive to the user's finger movements, and that can effectively span the range of the user's movements.

By way of example, in various embodiments, five-finger touch data can be obtained. The touch data obtained at each point in time can include 10 values, such as the x and y coordinates, i.e., absolute position, of each contact, to denote the position of the contact on the touch-sensing surface. For example, values $a_1$ to $a_{10}$ in each row in matrix 405 can be the 10 values of the x and y coordinates of the five contacts 401 at each point in time 403 (where the superscript of each "a" in the matrix represents the corresponding row, i.e., point in time). In other embodiments, the values in the matrix can be, for example, absolute motion, relative motion, absolute position, relative position, absolute proximity, etc., as mentioned above.

Now an example of a method of generating gesture components based on a sparse matrix decomposition will be described. Let 'N' be the total number of rows of matrix 405, i.e., the number of "snapshots" of touch data captured and stored. The resulting matrix A has dimensions N×10 which can be decomposed as follows:

$$A_{N\times 10} = W_{N\times n} C_{n\times 10}$$

where C denotes the gesture components that project each gesture into an 'n' dimensional basis, and W denotes the amounts of the various gestures across this basis. The equation can be optimized based on a cost function to obtain the decomposition. In various embodiments, a sparse matrix decomposition, such as:

$$\mathrm{Argmin}_{W,C} \|A - WC\|_F + \|C\|_1 \quad (1)$$

such that each element of W>=0 and max($W_{:,k}$)=1 can be used to learn a set of sparse components.

Equation (1) can be alternatively minimized over C and W, based on the number 'n' of gesture components to be determined. It should be noted that W can be used to constrain the solution so that C is properly conditioned and meaningful. It should also be noted that other optimizations are possible in other embodiments, e.g., principal component analysis (PCA), non-linear embeddings such as kernel PCA, etc. One skilled in the art will appreciate that the type of optimization can be used, for example, to produce gesture components C that are orthogonal or nonorthogonal. For example, a sparse matrix decomposition method can be used to produce nonorthogonal gesture components, while a PCA can be used to produce orthogonal components. The gesture components, C, can represent an n number of intuitive choices of gestures.

Referring to FIG. 4, matrix 405 can be processed by a gesture component processing module 407 in a touch controller 409. Gesture component processing module 407 can obtain matrix 405 and a number 'n' corresponding to the number of gesture components to be determined. In various embodiments, the number 'n' can be obtained, for example, from an input of the user via a keyboard or other input device. Gesture component processing module 407 can perform a sparse matrix decomposition of matrix 405 based on the number 'n' of gesture components to be determined.

Referring to FIG. 3, the gesture components can be stored (304) in a non-transitory computer-readable storage medium. For example, FIG. 4 shows gesture component processing module 407 storing gesture components 411 in a storage 413.

A set of gesture components, C, can be used, for example, to convert an arbitrary set of touch input, $A^j$, into an equivalently parameterized weight vector $W^j$, which is a weighted combination of the gesture components of C.

$$A^j = \Sigma W_i^j C_i \quad (2)$$

In other words, the weight vector $W^j$ can be estimated from $A^j$ by projecting $A^j$ through the pseudo-inverse of the component matrix C.

$$W^j = (CC^T)^{-1} C^T A^j \quad (3)$$

Using sparsity-based decomposition can have some advantages. For example, e.g., sparsity-based decomposition can arrange the components along data clusters. Therefore, the gesture components can represent gestures that are more intuitive for users. Also, the clusters can tend to make the gesture components more independent, while still allowing the use of more gesture components than the number of degrees of freedom of the touch-sensing system, which can help to avoid the previously discussed drawbacks of having a limited number of fixed motion components.

In various embodiments, different sets of gesture components can be generated based on, for example, different numbers of simultaneous functions, controls, actions, to be performed, different hand sizes, different touch surface sizes, different touch surface shapes, etc. For example, a trackpad manufacturer might generate three sets of gesture components corresponding to small, medium, and large hand sizes on a trackpad. The trackpad may store the sets of gesture components and be programed to detect the hand size of a user and provide the corresponding set of gesture components to a host processor to use for gesture processing.

In various embodiments, finger identity can be determined and used as a further parameter. For example, contacts can be clustered into one or two clusters (depending on whether one or two hands are being used), and the contact farthest from the cluster can be determined, and if this distance is over a threshold, denote this as the thumb. The remaining the contacts can be identified in the order of appearance as index, middle, ring, and little fingers.

A more detailed example using gesture components together with methods of training a set of touch inputs and using the trained set of touch inputs to determine control inputs will be described below.

FIGS. 6-11 illustrate examples of methods and systems of training a set of touch inputs and using the trained set of touch inputs to determine control inputs according to various embodiments. In various embodiments, a user can provide a set of example touch inputs that the user would like to correspond to control inputs of a computer. In this way, the user can personalize the processing of touch input into control inputs, such that the touch input can be suited to the specific application task. During a runtime phase, an arbitrary touch input (i.e., a touch input that was not one of the example touch inputs provided by the user during training)

can be obtained and converted into a set of continuous values that can correspond to multiple control inputs to a computing system.

Figure 6:
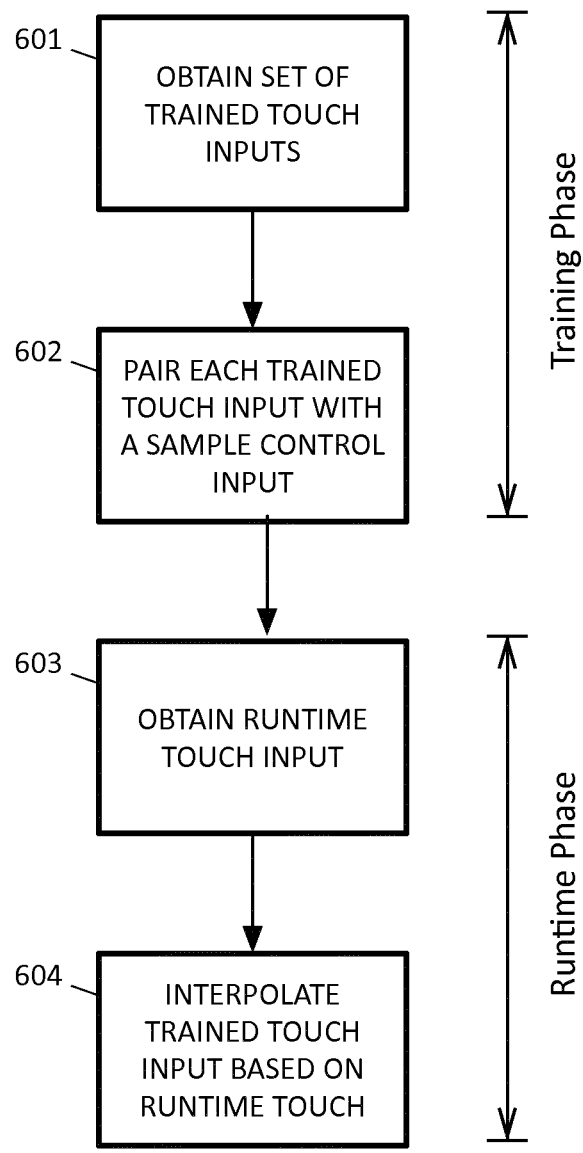
FIG. 6 is a flowchart of the example of the method of training a set of touch inputs and using the trained set of touch inputs to determine control inputs according to various embodiments.

FIG. 6 is a flowchart of the example of the method of training a set of touch inputs and using the trained set of touch inputs to determine control inputs according to various embodiments. FIGS. 7-10 illustrate an example of a system of training a set of touch inputs, and FIG. 11 illustrates an example of a runtime environment using the trained set of touch inputs to determine control inputs according to various embodiments.

Turning to FIG. 6, during a training phase, a set of touch inputs can be obtained (601) as trained touch inputs, and each trained touch input can be paired (602) with a set of sample control inputs to a computer system.

Figure 7:
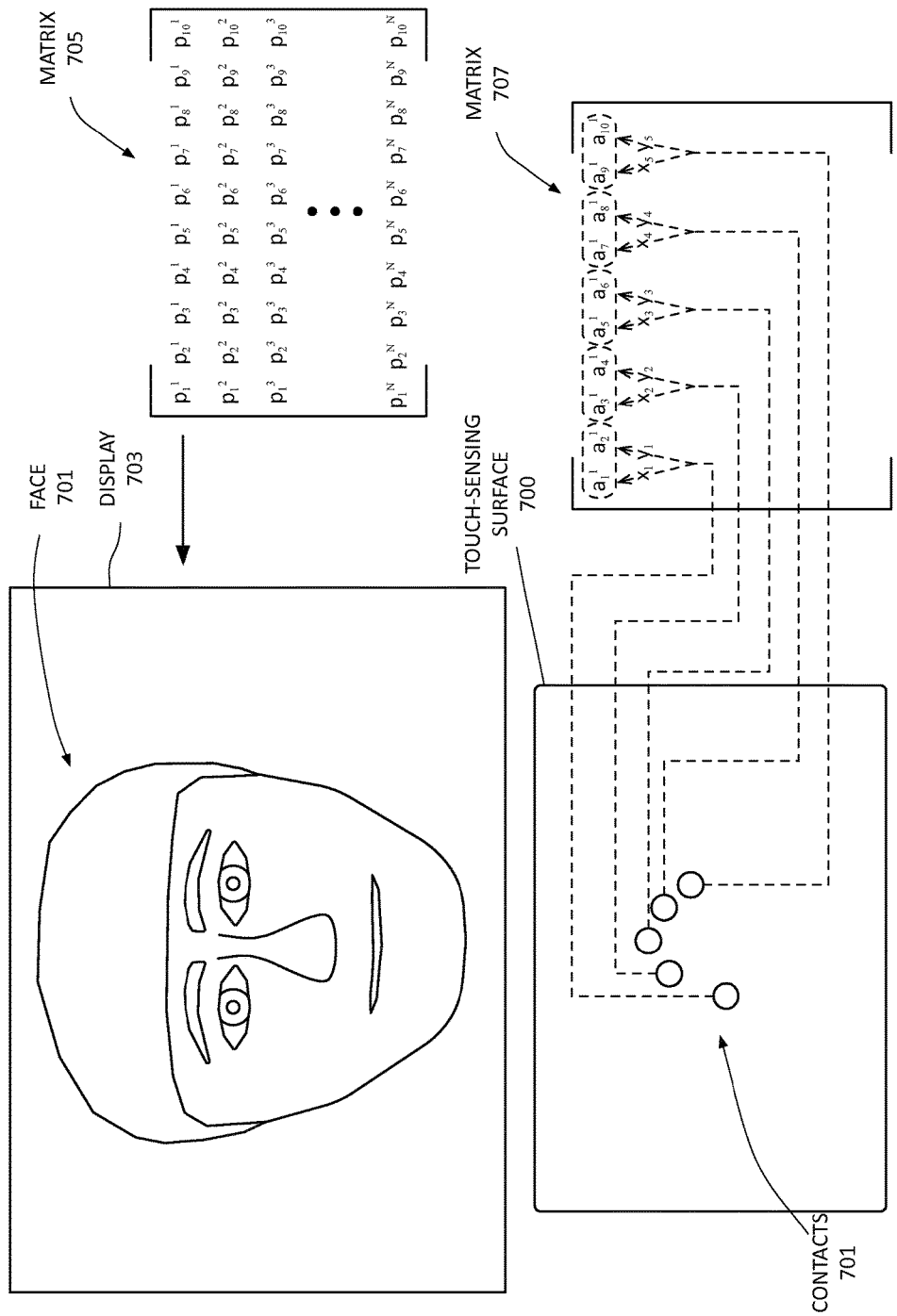
FIGS. 7-10 illustrate an example of a system of training a set of touch inputs according to various embodiments.

Referring to FIG. 7, a touch-sensing surface 700 can be used to obtain trained touch inputs to be paired with sample control inputs to a software application. In this example, the software application can be a software application for animating facial expressions, such as the software application described above with respect to FIGS. 2A and 2B. In the example of FIG. 7, the software application can allow touch input to adjust various features of a face 701 displayed on a display 703. Sample control inputs can be stored in a matrix 705. For example, the sample control inputs can be sample facial expressions in the facial expression software application. Each sample facial expression can have a corresponding set of sample control inputs $P^j$ for each of 'm' controls, $S_i$. The sample control inputs can be stored in a matrix P, such as matrix 705. For example, each facial expression can be described by a set of 'm' blendshapes, which can be considered as controls. Each of these blendshapes $S_i$ can be a set of 3-dimensional (3D) vertex offsets ($\Delta x$, $\Delta y$, $\Delta z$) from a rest pose of face 701 in a neutral expression, such the facial expression shown in FIG. 7. Each blendshape $S_i$ can be described concisely by stacking these offsets to a vector of size 3×n where n is the number of vertices in the 3D mesh used to generated face 701. These vectors can themselves be stacked to form a blendshape matrix S. A facial expression $F^j$ can be generated by linearly combining these blendshapes.

A first sample facial expression, corresponding to a first set of sample control inputs $P^j$ (e.g., the first row of 'p' values in matrix 705), can be displayed on display 703, and a user can perform a touch input on touch-sensing surface 700, which can be stored in a matrix 707 as a trained touch input $A^j$ (e.g., the first row of 'a' values in matrix 707). Thus, the trained touch input can be paired with a corresponding set of control inputs.

Figure 8:
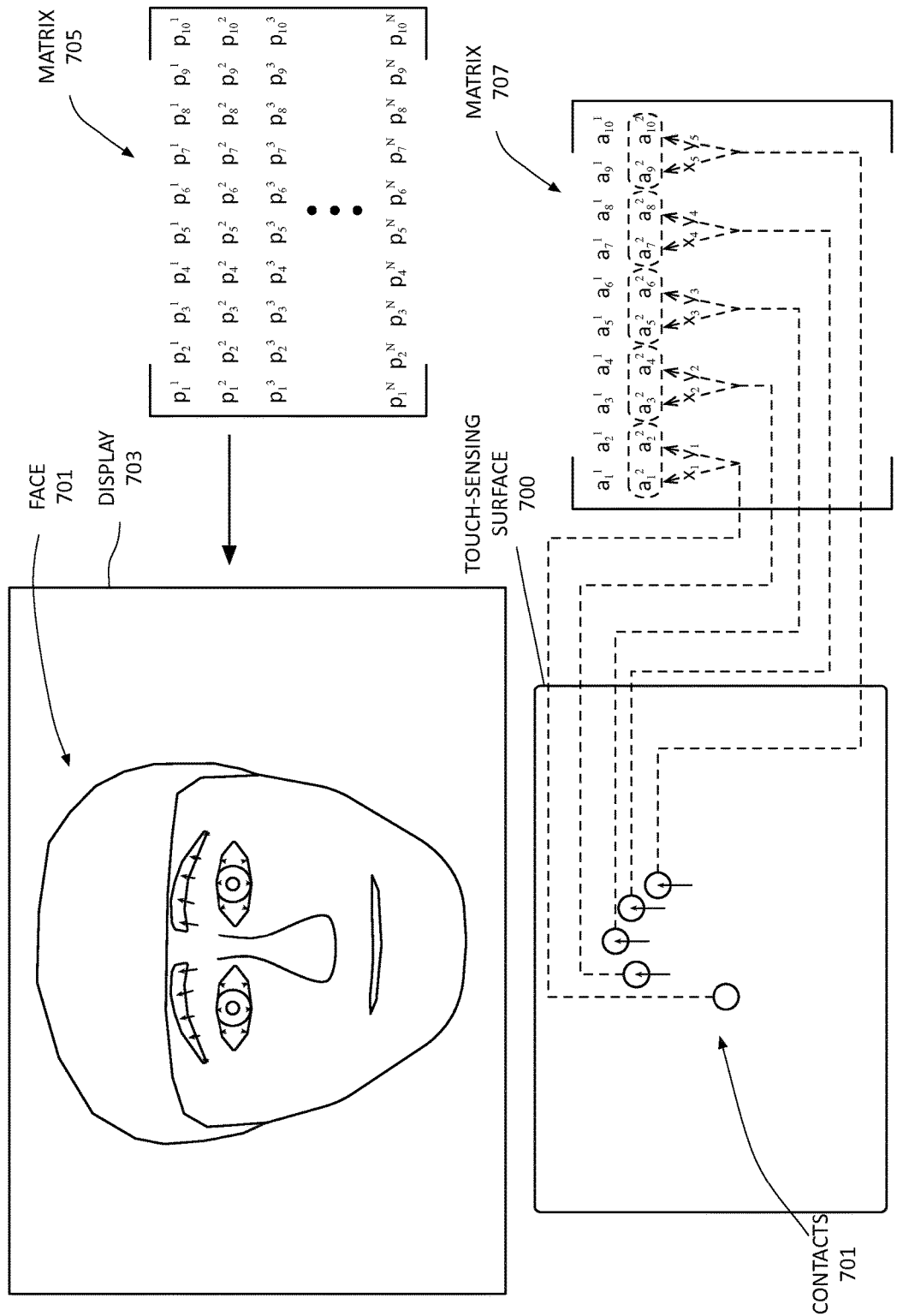
Figure 9:
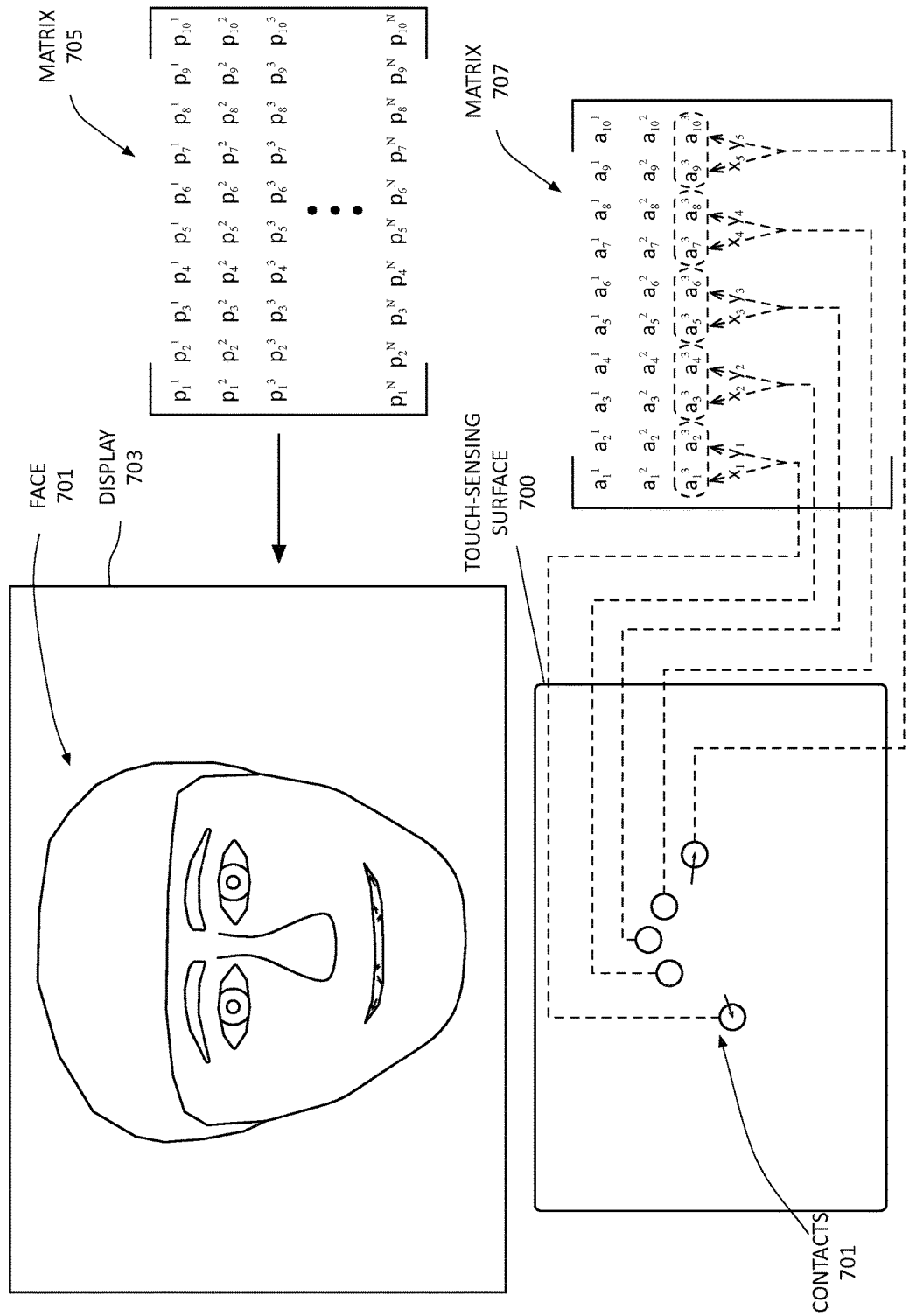
Figure 10:
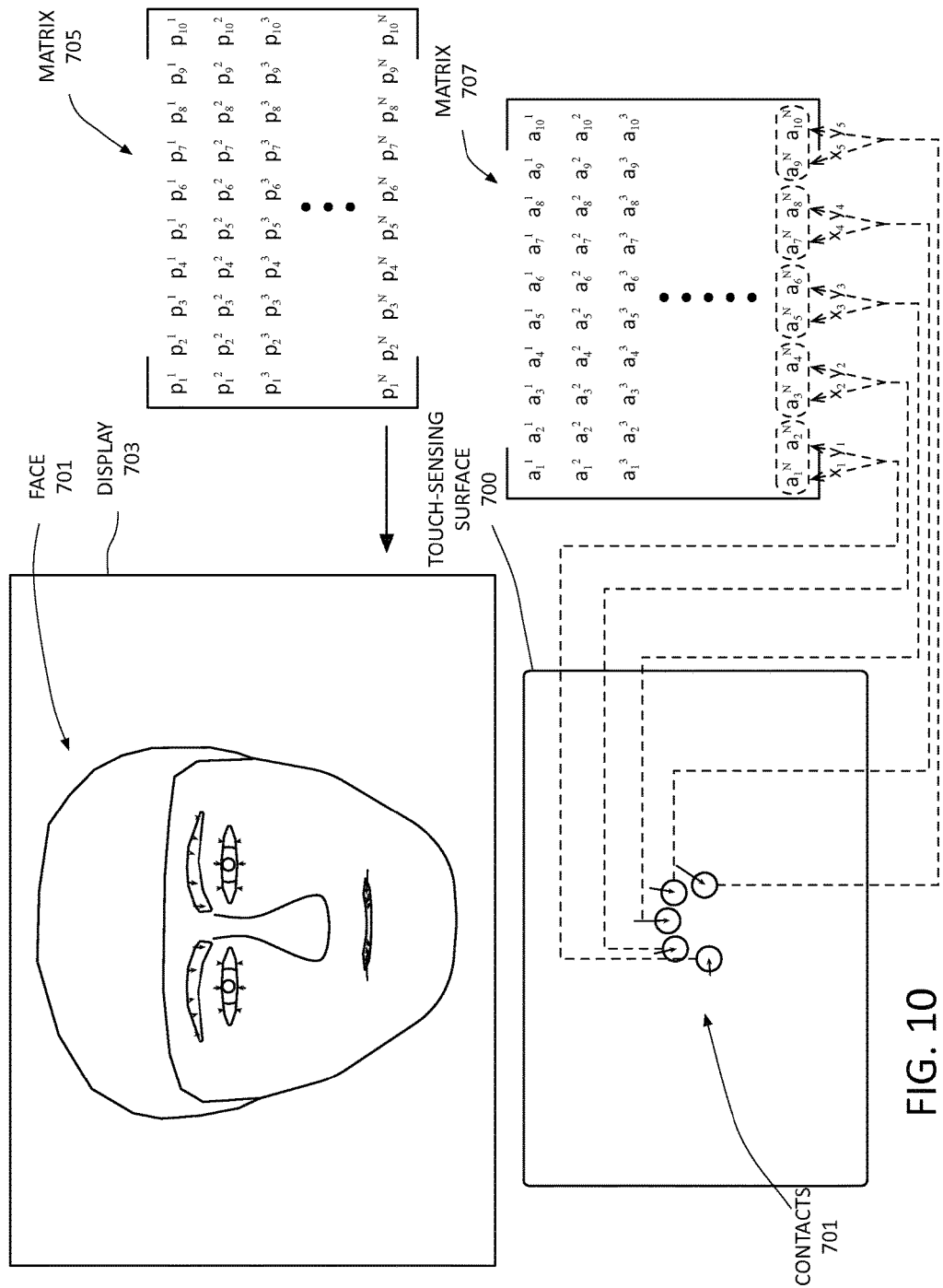
Figure 11:
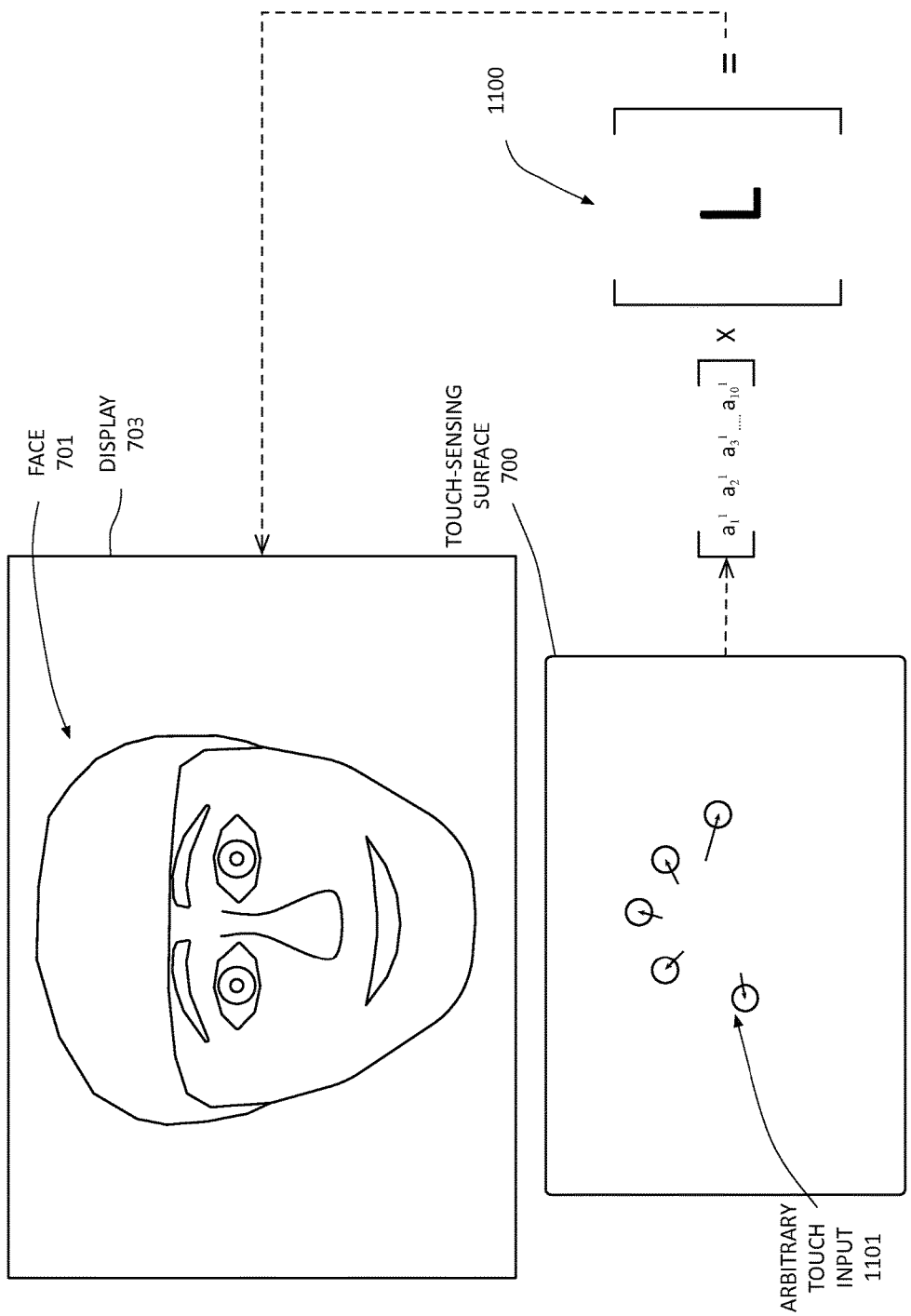
FIG. 11 illustrates an example of a runtime environment using the trained set of touch inputs to determine control inputs according to various embodiments.

FIGS. 8-10 illustrate additional sample facial expressions displayed and corresponding trained touch inputs being stored in matrix 707 to pair the trained touch inputs with the corresponding control inputs of matrix 705.

Referring to FIG. 6, during a runtime phase, the paired correspondences of trained touch inputs and sample control inputs can be used to determine control inputs from arbitrary touch inputs. For example, a touch input can be obtained (603) as runtime touch input, and the trained touch input can be interpolated (604) based on the runtime touch input to determine a control input of the computing system, i.e., an arbitrary facial gesture.

For example, an interpolation can be provided by a linear mapping function L, which can be determined, for example by:

$$L = \mathrm{Argmin}_L \|P - L \cdot A\|_F$$

It should be noted that other mapping functions could be used, e.g., applying non-linear kernel regression, using neural networks, etc., as one skilled in the art would readily understand.

FIG. 11 illustrates an example of a runtime phase in which a mapping function L 1100 can be applied to an arbitrary touch input 1101 to generate a new facial expression of face 701.

Figure 12:
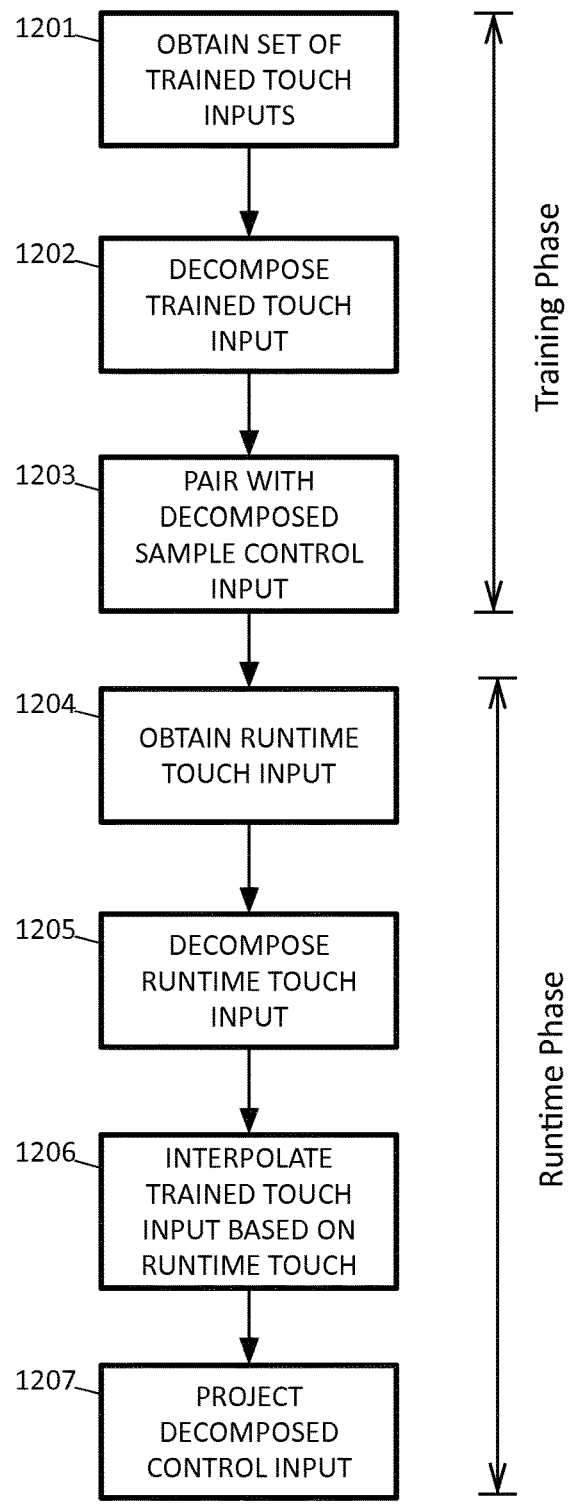
FIG. 12 illustrates an example of a method of training a set of touch inputs based on predetermined gesture components and using the trained set of touch inputs and the gesture components to determine control inputs according to various embodiments.

As mentioned above, gesture components determined by the method described with respect to FIGS. 3-5 can be used together with methods of training a set of touch inputs and using the trained set of touch inputs to determine control inputs. In this regard, FIG. 12 illustrates an example of a method of training a set of touch inputs based on predetermined gesture components and using the trained set of touch inputs and the gesture components to determine control inputs. During a training phase, a set of touch inputs can be obtained (1201) as trained touch inputs. The trained touch inputs can be decomposed (1202) based on a predetermined set of gesture components, and each decomposed trained touch input can be paired (1203) with a set of similarly decomposed sample control inputs to a computer system. During a runtime phase, a touch input can be obtained (1204) as runtime touch input, and the runtime touch input can be decomposed (1205) based on the set of gesture components. The decomposed trained touch input can be interpolated (1206) based on the decomposed runtime touch input to determine a decomposed control input of the computing system, i.e., an arbitrary facial gesture. The decomposed control input can be projected (1207) back into a space of control inputs.

For example, each trained touch input decomposed based on a set of gesture component (i.e., projected onto the set of gesture components) to obtain a weight vector $W^j$, which can be paired with a sample facial expression $F^j$ (given by its weight vector $T^j$, as the blendshapes $S_i$ are assumed to be known). Each pair ($W^j$, $T^j$) gives a training example. These columns can be stacked to form matrices W and T. In various embodiments, the user can be guided in which gestures to perform during training, for example. These examples can be used to learn a mapping function L. In various embodiments, a linear mapping function can be determined by:

$$L = \mathrm{Argmin}_L \|T - L \cdot W\|_F$$

It should be noted that other mapping functions could be used, e.g, applying non-linear kernel regression, using neural networks, etc., as one skilled in the art would readily understand.

Projecting touch input A into a "gesture space" using gesture components, represented for example by matrix C, can have benefits such as allowing the use of fewer interactive training samples and helping to make interpolation behave in a more natural way, as one skilled in the art would understand.

In this way, for example, the n-dimensional space of the gesture components determined using the freeform gesture learning process above can be "annotated" by the user through a set of sparse training examples. Each example can annotate a meaningful control setting for the user in the n-dimensional gesture space. Any non-explicitly defined correspondences can be determined through interpolation based on these explicitly defined correspondences. Each of the given examples is associated with a point in the m-dimensional space of the controls.

Figure 13:
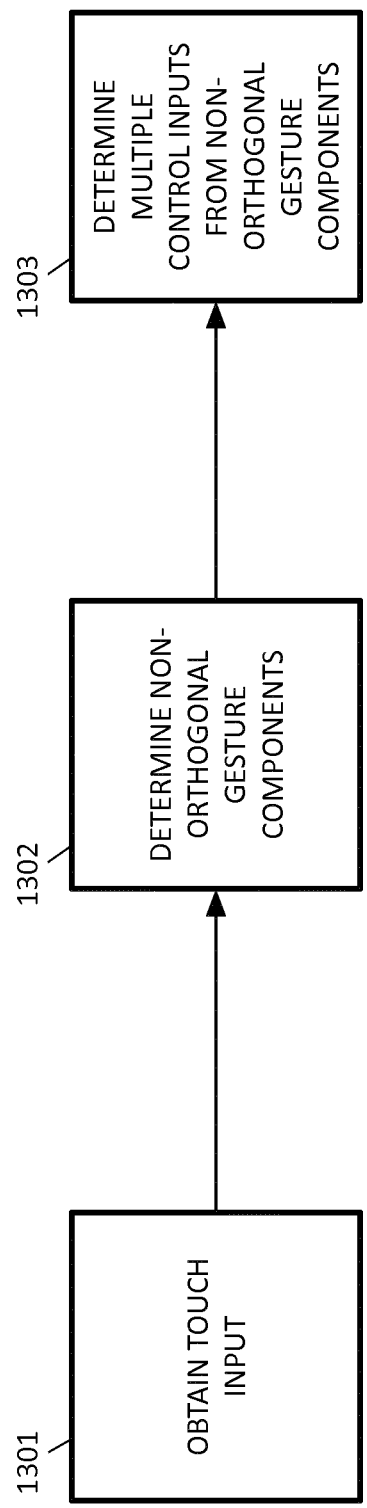
FIG. 13 is an example of a general method of determining multiple control inputs based on touch input according to various embodiments.

FIG. 13 is an example of a general method of determining multiple control inputs based on touch input according to various embodiments. Touch input can be obtained (1301)

from a touch-sensing surface, and nonorthogonal gesture components of the touch input can be determined (1302). Multiple control inputs of a computing system can be determined (1303) based on the nonorthogonal gesture components. In various embodiments, the general method of FIG. 13 can be accomplished by a method such as described above with respect to FIG. 12, where the predetermined gesture components are nonorthogonal. As one skilled in the art would appreciate, other methods may be used to obtain nonorthogonal gesture components that may be used in the general method of FIG. 13. As described above, the use of nonorthogonal gesture components may provide significant benefits versus conventional gesture processing, such as providing more intuitive touch control of complex control input motions.

Figure 14:
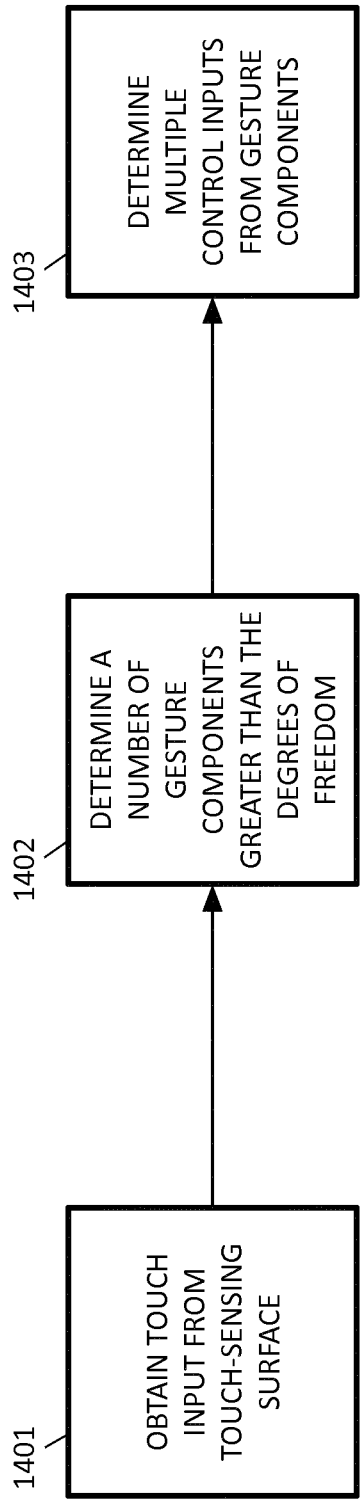
FIG. 14 is another example of a general method of determining multiple control inputs based on touch input according to various embodiments.

FIG. 14 is another example of a general method of determining multiple control inputs based on touch input according to various embodiments. Touch input can be obtained (1401) from a touch-sensing surface, and a number of gesture components of the touch input can be determined (1402), where the number of gesture components is greater than the number of degrees of freedom capable of being detected by the touch-sensing system. Multiple control inputs of a computing system can be determined (1403) based on the gesture components. In various embodiments, the general method of FIG. 14 can be accomplished by a method such as described above with respect to FIG. 12, where the number of predetermined gesture components is greater than the number of degrees of freedom capable of being detected by the touch-sensing system. As one skilled in the art would appreciate, other methods may be used to obtain a set of gesture components that outnumbers the degrees of freedom of the touch-sensing system that may be used in the general method of FIG. 14. As described above, by using more gesture components than a number of degrees of freedom capable of being detected by the touch-sensing system, touch input may be more intuitively matched with control inputs, particularly in situations involving a large number of control inputs that are capable of being controlled simultaneously.

Figure 15:
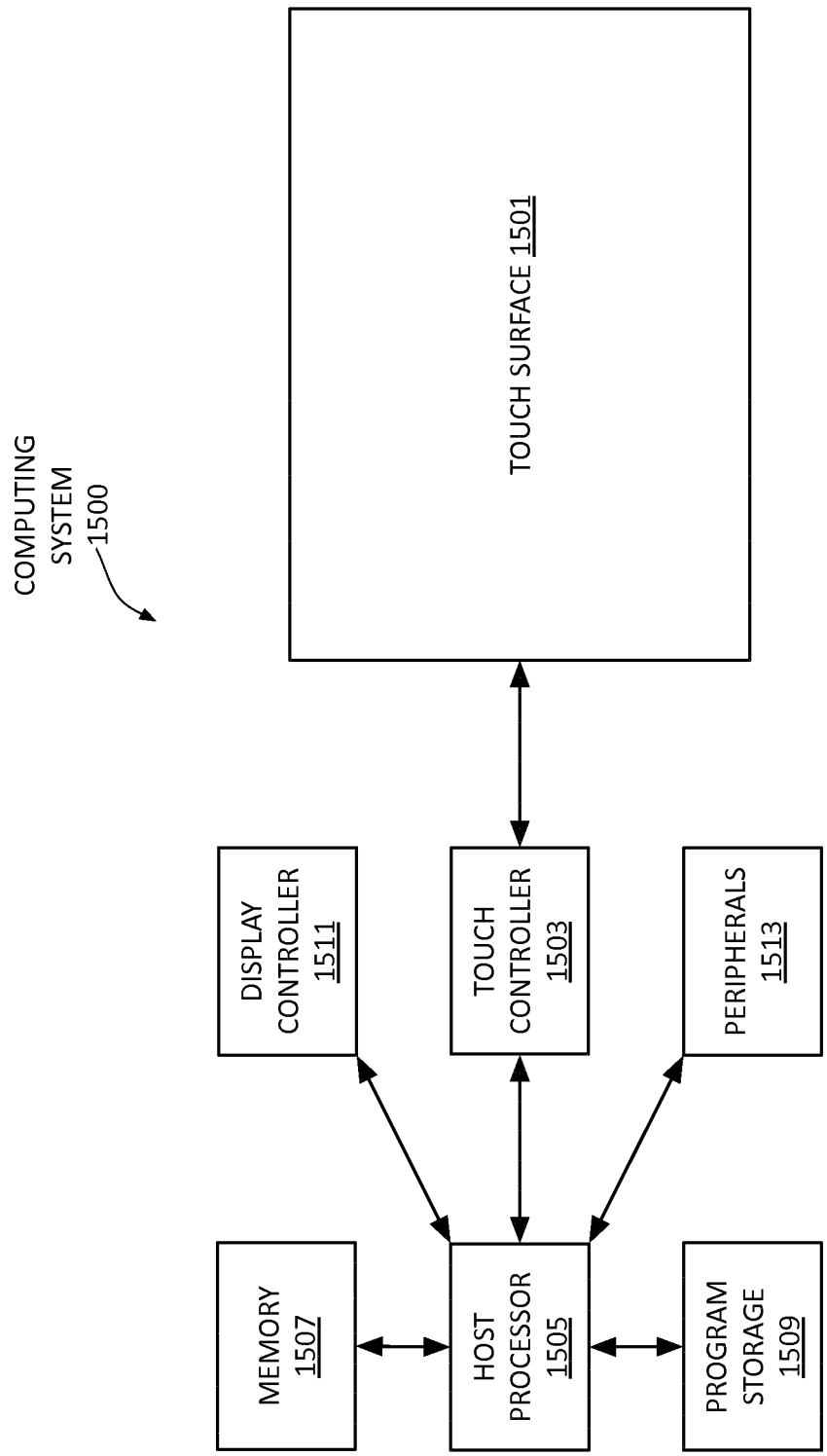
FIG. 15 is a block diagram of an example of a computing system that illustrates one implementation according to various embodiments.

FIG. 15 is a block diagram of an example of a computing system 1500 that illustrates one implementation according to various embodiments. In various embodiments, computing system 1500 could be included in, for example, a smart phone, a digital media player, computer 100, tablet computer 150, etc. In various embodiments, computing system 1500 can have a touch-sensing system including a touch surface 1501 and a touch controller 1503. In various embodiments, touch surface 1501 can be, for example, a touchscreen, a trackpad, etc.

The touch-sensing system can be, for example, a capacitive-type touch-sensing system. For example, touch surface 1501 can include touch-sensing circuitry that can include a capacitive-sensing medium with drive lines and sense lines (not shown) that can overlap to form an array of capacitive-sensing nodes. The drive lines can be driven with stimulation signals from touch controller 1503, and resulting sense signals generated in the sense lines can be received by the touch controller. The sense signals can be processed by touch controller 1503 to obtain information of a capacitance at each capacitance-sensing node. A conductive touch object, such as a finger, a stylus, etc., can change the capacitance sensed at a node as the conductive object approaches close to the node. In this way, the capacitance sensed at each node can provide information of the proximity of a touch object. At any given time, the capacitances sensed by all of the nodes in the array can provide a "picture" of the proximity of touch objects to the array, i.e., a touch picture. For this reason, the nodes can be thought of as touch picture elements, or touch pixels.

Although the examples described herein are directed to capacitive-based touch-sensing, it should be understood that touch surface 1501 can be any type of touch-sensing surface. For example, in various embodiments touch surface 1501 can be an optical-type touch sensor, a pressure-type touch sensor, a surface acoustic wave (SAW) touch sensor, etc.

Computing system 1500 can also include a host processor 1505 that can receive outputs from touch controller 1503 and can perform actions based on the outputs. For example, host processor 1505 can be connected to a memory 1507 and program storage 1509, which can store computer-executable instructions (e.g., computer programs, operating systems, etc.) that can implement functions according to various embodiments. Computing system 1500 can also include a display controller 1511, such as an LCD driver, touchscreen display driver, etc., that can control a display to generate images, such as a graphical user interface (GUI), movies, etc. In various embodiments, touch surface 1501 can be a touchscreen, which includes a display, and display controller 1509 can drive the touchscreen to display images. In other embodiments, computing system 1500 can include a display separate from touch surface 1501, such as a liquid crystal display (LCD), an organic light emitting diode (OLED) display, etc., which display controller 1511 can control to generate images. Computing system 1500 can also include peripherals 1513. Peripherals 1513 can include, but are not limited to, printers, other input devices, such as computer mice, keyboards, etc., watchdog timers, and the like.

Touch input sensed on touch surface 1501 can be used by computer programs stored in program storage 1509 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, interacting with a virtual world, playing computer games, etc.

It should also be appreciated that although various examples of various embodiments have been shown and described in detail herein, those skilled in the art can readily devise other varied embodiments that still remain within the scope of this disclosure.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry, electrical components, optical components, etc., embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function, software in any form, including, therefore, firmware, microcode or the like, combined with appropriate circuitry for executing that software to perform the function, etc. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method comprising:
obtaining touch data from a touch-sensing surface, the touch data being stored in a matrix;
selecting a number of gesture components to be generated;
generating a set of gesture components based on the touch data and the number of gesture components by performing a sparse matrix decomposition of said matrix;
obtaining a first touch input from the touch-sensing surface;
determining a projection of the first touch input on said set of gesture components; and
determining a plurality of control inputs of a computing system based on said projection.

2. The method of claim 1, wherein the number of gesture components to be generated is based on a number of control inputs of the computing system.

3. The method of claim 1, wherein the gesture components are non-orthogonal.

4. The method of claim 1, wherein the number of gesture components is greater than a number of degrees of freedom capable of being detected by a touch-sensing system used to sense the touch data.

5. The method of claim 1, wherein determining the plurality of control inputs includes obtaining a set of trained touch inputs, pairing each trained touch input with a sample control input of the computing system, and interpolating the set of trained touch inputs based on the first touch input.

6. The method of claim 5, wherein interpolating the set of trained touch inputs includes determining a linear mapping function of the trained touch inputs.

7. The method of claim 1, wherein the first touch input includes at least one of an absolute motion, a relative motion, an absolute position, a relative position, an absolute proximity, a relative proximity, a change in proximity, an absolute size, a relative size, or a change in size.

8. The method of claim 1 further comprising:
storing (304) the set of gesture components in a non-transitory computer-readable medium; and
storing said projection in a non-transitory computer-readable medium.

9. The method of claim 1, further comprising:
obtaining a second touch input; and
interpolating the set of first touch inputs based on the second touch input to determine a runtime control input of the computing system.

10. A system comprising a memory storing instructions configured to cause a processor to:
obtain touch data from a touch-sensing surface, the touch data being stored in a matrix;
select a number of gesture components to be generated;
generate a set of gesture components based on the touch data and the number of gesture components by performing a sparse matrix decomposition of said matrix;
obtain a first touch input from the touch-sensing surface;
determine a projection of the first touch input on said set of gesture components; and
determine a plurality of control inputs of a computing system based on said projection.

11. The system of claim 10, wherein the number of gesture components to be generated is based on a number of control inputs of the computing system.

12. The system of claim 10 wherein the processor is further configured to:
store the set of gesture components in a non-transitory computer-readable medium; and
store said projection in a non-transitory computer-readable medium.

13. The system of claim 10 wherein the processor is further configured to:
obtain a second touch input; and
interpolate the set of first touch inputs based on the second touch input to determine a runtime control input of the computing system.

14. A non-transitory computer-readable medium storing computer-executable instructions executable to perform a method comprising:
obtaining touch data from a touch-sensing surface, the touch data being stored in a matrix;
selecting a number of gesture components to be generated;
generating a set of gesture components based on the touch data and the number of gesture components by performing a sparse matrix decomposition of said matrix;
obtaining a first touch input from the touch-sensing surface;

determining a projection of the first touch input on said set of gesture components; and determining a plurality of control inputs of a computing system based on said projection.

* * * * *